United States Patent
Miyao et al.

(10) Patent No.: US 10,397,560 B2
(45) Date of Patent: Aug. 27, 2019

(54) TRANSMISSION-TYPE DISPLAY

(71) Applicant: SEIKO EPSON CORPORATION, Tokyo (JP)

(72) Inventors: Toshiaki Miyao, Matsumoto (JP); Masayuki Takagi, Matsumoto (JP); Akira Komatsu, Tatsuno-machi (JP); Takahiro Totani, Suwa (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 579 days.

(21) Appl. No.: 15/093,081

(22) Filed: Apr. 7, 2016

(65) Prior Publication Data

US 2016/0320623 A1 Nov. 3, 2016

(30) Foreign Application Priority Data

May 1, 2015 (JP) ................................ 2015-093916

(51) Int. Cl.
*H04N 13/383* (2018.01)
*G02B 27/01* (2006.01)
*H04N 13/39* (2018.01)
*H04N 13/128* (2018.01)
*H04N 13/344* (2018.01)
*H04N 13/398* (2018.01)

(52) U.S. Cl.
CPC ....... *H04N 13/383* (2018.05); *G02B 27/0172* (2013.01); *G02B 27/0176* (2013.01); *H04N 13/128* (2018.05); *H04N 13/344* (2018.05); *H04N 13/398* (2018.05); *G02B 2027/014* (2013.01); *G02B 2027/0134* (2013.01); *G02B 2027/0138* (2013.01); *G02B 2027/0181* (2013.01); *G02B 2027/0185* (2013.01)

(58) Field of Classification Search
None
See application file for complete search history.

(56) References Cited

U.S. PATENT DOCUMENTS

| | | | | |
|---|---|---|---|---|
| 6,324,001 | B2 * | 11/2001 | Tabata | G02B 27/0172 359/462 |
| 10,042,171 | B2 * | 8/2018 | Yajima | G02B 27/0179 |
| 2001/0030715 | A1 * | 10/2001 | Tabata | G02B 27/0172 349/15 |
| 2003/0197933 | A1 * | 10/2003 | Sudo | H04N 13/211 359/464 |
| 2011/0002533 | A1 * | 1/2011 | Inoue | G09G 3/003 382/154 |

(Continued)

FOREIGN PATENT DOCUMENTS

| | | |
|---|---|---|
| JP | 2010-027738 A | 2/2010 |
| JP | 2010-139589 A | 6/2010 |

(Continued)

*Primary Examiner* — Reza Aghevli
(74) *Attorney, Agent, or Firm* — Oliff PLC

(57) ABSTRACT

In first and second display devices that are provided in a pair on the left and right sides, image light and external light are superimposed on each other and viewed. In this case, a parallax of an angle (the value of angle) is set by a frame unit functioning as a parallax setting unit tilting principal rays of left and right image light inwardly, and the angle of convergence of an observer is in an appropriate state in the case of viewing the image light.

14 Claims, 12 Drawing Sheets

(56) References Cited

U.S. PATENT DOCUMENTS

| | | | |
|---|---|---|---|
| 2011/0043616 A1* | 2/2011 | Dobbie | G02B 27/017 348/62 |
| 2012/0044571 A1 | 2/2012 | Mukawa | |
| 2012/0206452 A1* | 8/2012 | Geisner | G02B 27/017 345/419 |
| 2012/0235886 A1* | 9/2012 | Border | G02B 27/0093 345/8 |
| 2012/0236031 A1* | 9/2012 | Haddick | G02B 27/0093 345/633 |
| 2013/0278631 A1* | 10/2013 | Border | G02B 27/017 345/633 |
| 2013/0300899 A1* | 11/2013 | Tamura | H04N 5/2351 348/234 |
| 2014/0085282 A1* | 3/2014 | Luebke | G06F 3/147 345/207 |
| 2014/0334010 A1 | 11/2014 | Mukawa | |
| 2015/0009416 A1* | 1/2015 | Tamayama | H04N 5/64 348/746 |
| 2015/0205126 A1* | 7/2015 | Schowengerdt | G06T 13/40 345/633 |
| 2016/0165218 A1* | 6/2016 | Seo | G02B 27/0172 345/8 |
| 2016/0216520 A1* | 7/2016 | Yajima | G02B 27/0179 |
| 2016/0284129 A1* | 9/2016 | Nishizawa | G06F 3/013 |
| 2017/0206666 A1* | 7/2017 | Homma | G06T 7/246 |
| 2017/0287222 A1* | 10/2017 | Fujimaki | G06T 19/006 |
| 2017/0289533 A1* | 10/2017 | Ono | G06F 3/011 |
| 2017/0357092 A1* | 12/2017 | Griffin | G02B 3/10 |
| 2018/0214007 A1* | 8/2018 | Yamazaki | A61B 1/00009 |
| 2018/0241983 A1* | 8/2018 | Kimura | H04N 13/122 |
| 2018/0276898 A1* | 9/2018 | Nishizawa | G06F 3/011 |
| 2018/0335635 A1* | 11/2018 | Yajima | G02B 27/0179 |

FOREIGN PATENT DOCUMENTS

| | | |
|---|---|---|
| JP | 2012-042654 A | 3/2012 |
| JP | 2013-537784 A | 10/2013 |

* cited by examiner

TRANSMISSION-TYPE DISPLAY

BACKGROUND

1. Technical Field

The present invention relates to a transmission-type display such as a head mount display that presents an image formed by an image display element or the like to an observer.

2. Related Art

In a transmission-type display such as a head mount display (hereinafter, also referred to as a HMD) that is mounted on the head of the observer, development of augmented reality sensation (hereinafter, also referred to as AR or augmented reality) in which image light is superimposed on a world that is viewed in the real field of view is expected. For example, a technique of determining a distance to an object of interest of the user by using a focusing mechanism of a camera such that the position of the image is consistent with the position of the real world, and performing an image shift of an appropriate amount on the image that is displayed on the display device provided in front of the eye, in order to make a modification on the difference between the positions of the camera and the eye of the observer has been known (see JP-T-2013-537784).

Here, although the see-through type HMD is roughly divided into a single-eye type HMD that projects the image light to one eye, and a both-eye type HMD that projects the image light to both eyes, since humans estimate the distance from the image light to be projected in the single-eye type, it is considered that there is a case where it is difficult to feel the sense of distance. On the contrary, in the both-eye type HMD, since the distance of the image light is felt more accurately by displaying the image light (an image with a parallax) adjusted to the left and right eyes, it is possible to cause the wearer of the HMD (observer) to experience the world of a more realistic AR. For example, for the purpose of assistance in a work site or the like, development of the HMD corresponding to the AR has progressed in recent years.

However, in the case of performing visual recognition corresponding to AR by using the parallax generated by projecting different images to the left and right sides at the time of binocular vision, a so-called contradiction between the convergence and the focus adjustment of the eye (hereinafter, referred to as regulation) occurs. In the case of binocular vision, what has an important role in understanding the sense of distance of the image light is an angle of convergence which is the angle formed by the display object and the right and left eyes. In general, if the actual object is placed close to the eye and is viewed, the angle of convergence increases; in contrast, if the actual object is placed far from the eye and is viewed, the angle of convergence decreases. Since a parallax is generated by forming images which are deviated in the left and right direction by shifting an image through a software correction process, by using the above fact, and changing the angle of convergence of the eye of the observer, pseudo stereoscopic vision is possible. In the case of changing the angle of convergence in this manner, if the image distance, that is, the display position of the image light is not changed and maintained, only by performing a correction process of the image, without performing an optical process such as changing the focal distance, the regulation maintains constant and it becomes a state where the angle of convergence and the regulation do not match. Therefore, if the shift amount of the image is particularly great, a problem in contradiction between the angle of convergence and the regulation increases, and there is a concern that fatigue of the observer becomes significant. In particular, in the case of processing the AR at a work site, it is considered that it becomes a major problem.

SUMMARY

An advantage of some aspects of the invention is to provide a transmission-type display capable of reducing the fatigue of an observer, in a state that enables augmented reality (AR) that superimposes image light on a world that is viewed in the real field of view, from a comparison of the outside world and an image caused by image light.

A transmission-type display according to an aspect of the invention includes display devices that are provided in a pair on the left and right sides, each of which guides image light and causes image light and external light to be superimposed on each other and viewed; and a parallax setting unit that sets a parallax to a predetermined angle or more by tilting a principal ray of image light which is emitted from each of the display devices.

In the transmission-type display, when causing the image light and the external light to be superimposed on each other and viewed in the left and right display devices of a pair, since the angle of convergence of the observer is in an appropriate state in the case of viewing the image light while enabling the AR process by setting a parallax of a predetermined angle or more in the left and right image light by the parallax setting unit, it is possible to reduce the fatigue of the observer in the use state of comparing the outside world and the image caused by the image light.

In a specific aspect of the invention, the parallax setting unit sets the parallax to a predetermined angle within a range of 0.2° to 7.4°. In this case, it is possible to set the angle of convergence of the observer, in other words, an extent of the sense of distance for the image light that the observer has, by performing the angle setting of adding the parallax within the above range depending on the intended use or the like, and to make the state of viewing the image light suitable for the intended use, for enabling the AR process for the outside world and the image caused by the image light.

In another aspect of the invention, the parallax setting unit sets the parallax to a predetermined angle within a range of 0.2° to 2.0°. In this case, it is possible to set a parallax in a wide range from the case of feeling that the image is relatively far to the case of feeling that the image is relatively close, as a sense of distance.

In still another aspect of the invention, the parallax setting unit sets the parallax to a predetermined angle within a range of 1.0° to 5.0°. In this case, it is possible to set the parallax in a range from the case of feeling that the image is viewed with a certain sense of distance to the case of feeling that the image is viewed with a sense of distance of seeing the image at hand, and it is possible to cause the observer to experience the world of AR with an appropriate sense of distance, in many cases of use at a wide variety of work sites.

In still another aspect of the invention, the pair of left and right display devices sets an assumed display position of an image viewed by image light relative to an assumed eye position, corresponding to the parallax that is set by the parallax setting unit. In this case, it is possible to reduce the contradiction between the angle of convergence and the regulation in the case of viewing the image light, by adjusting the assumed display position of the image light, depending on the degree of the set parallax.

In still another aspect of the invention, the pair of left and right display devices sets the assumed display position of an image viewed by image light to a focal distance that is approximately 4 m away from the assumed eye position, and the parallax setting unit sets the parallax to a predetermined angle corresponding to the assumed display position, by positioning and fixing the display devices. In this case, it is easy to form an image of a sense of distance that is commonly required in use at many work sites. Further, it is possible to achieve a reduction in the size and the weight of the device, by fixing the focal distance.

In still another aspect of the invention, the pair of left and right display devices includes an image correction mechanism that performs correction by shifting the left and right images in a range corresponding to an angle difference within ±1.0° of the parallax, with respect to the position of a display distance corresponding to the parallax that is set by the parallax setting unit. In this case, an adjustment of changing the sense of distance given to the observer by the image correction, in other words, an adjustment for depth of an image is enabled, and it is possible to perform an AR process more flexibly. Further, in this case, since the image correction is performed in a range which is not excessively great from the parallax for which the angle difference is set, it is possible to suppress the fatigue caused by the contradiction between the angle of convergence and the regulation.

In still another aspect of the invention, the pair of left and right display devices further includes a focal distance adjustment unit that adjusts a focal distance, and the parallax setting unit may include an angle changing unit that adjusts the parallax by changing the posture of the pair of left and right display devices. In this case, since the focal distance is adjusted by the focal distance adjustment unit and the parallax is adjusted using the angle change by the angle changing unit, it is possible to change the assumed display position of the image that is visually recognized by the image light, according to the change of the parallax.

In still another aspect of the invention, the parallax setting unit changes the postures of the display devices by using a deformable and movable element. In this case, it is possible to adjust the parallax by changing the postures of the left and right display devices of a pair by the movable element.

In still another aspect of the invention, the parallax setting unit is a frame unit that positions and fixes the display devices in a pair on the left and right sides. In this case, it is possible to reliably set the parallax to a predetermined angle, by positioning and fixing the display devices by the frame unit.

In still another aspect of the invention, the parallax setting unit is an angle adjustment member that is provided in an installation unit that connects the left and right display devices of a pair. In this case, it is possible to reliably set the parallax to a predetermined angle, for example, even in the transmission-type display having a configuration without the frame unit.

In still another aspect of the invention, the transmission type display further includes a flip-up mechanism that flips up the pair of left and right display devices so as to be retracted from an eye front position. In this case, it is possible to improve convenience, in a use state of watching the image light as required during the operation.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a transmission-type display according to a first embodiment of the invention will be described in detail with reference to FIG. 1 and the like.

Figure 1:
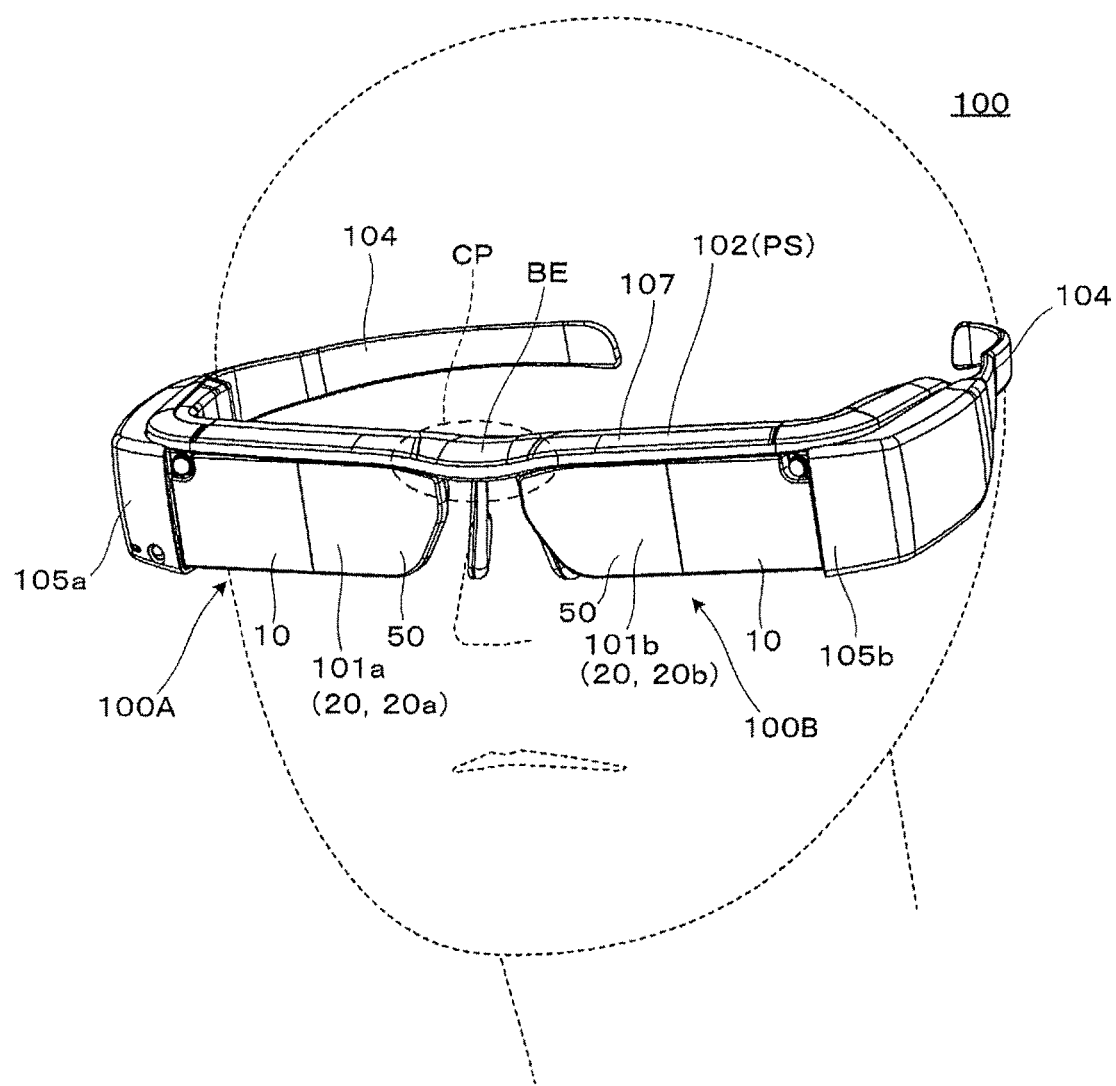
FIG. 1 is a perspective view briefly illustrating the appearance of an example of a transmission-type display according to a first embodiment.
Figure 2:
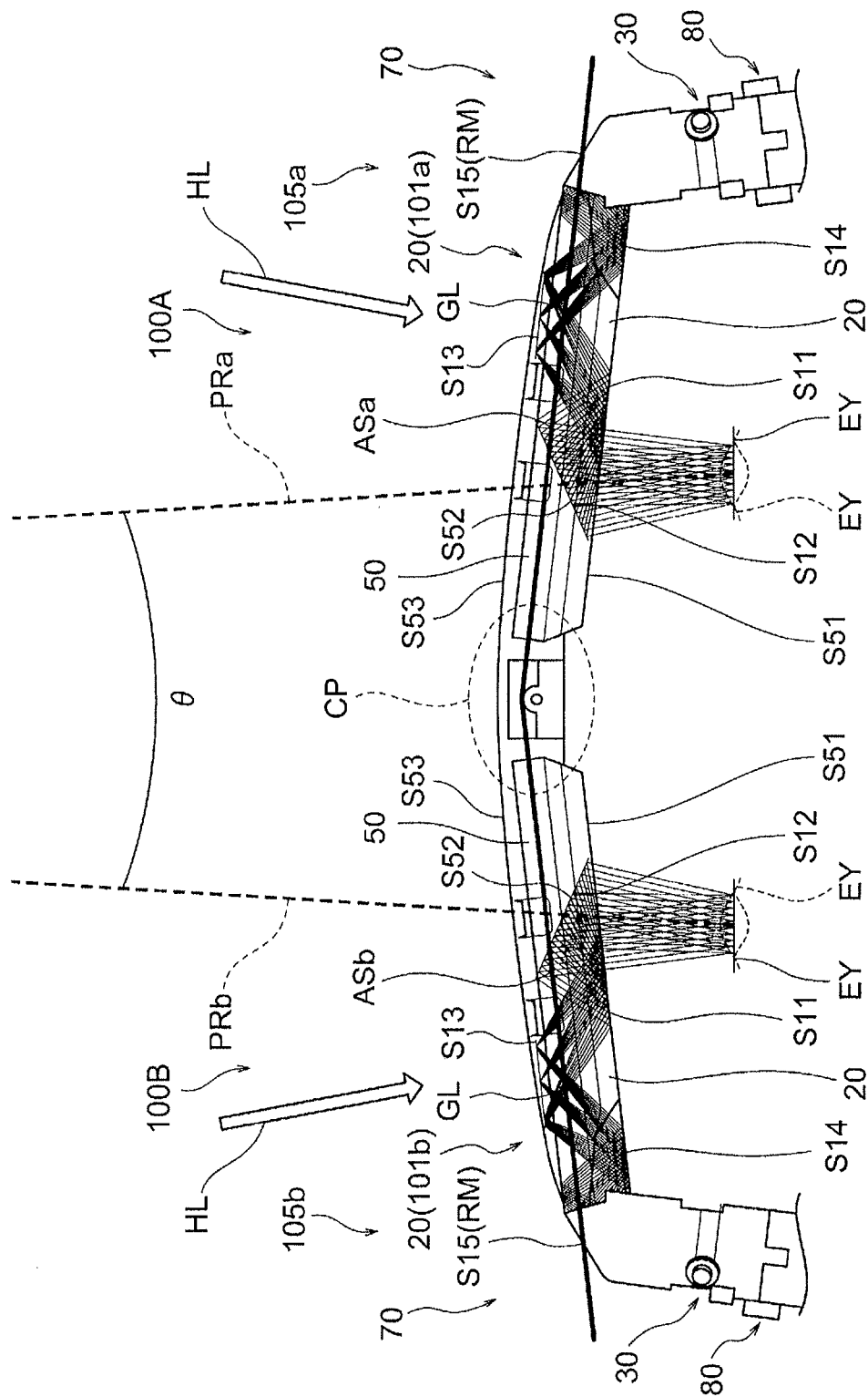
FIG. 2 is a cross-sectional view of a body portion that constitutes the transmission type display device in a plan view.

As described in FIGS. 1 and 2, the transmission-type display 100 of the present embodiment is a head mount display having an appearance such as glasses, and is a transmission-type display allowing the observer or the user wearing the transmission-type display 100 to visually recognize image light of a virtual image, and the observer to visually recognize or to observe an image of the outside world in a see-through manner. The transmission-type display 100 includes first and second optical members 101a, 101b that cover the front of the eyes of the observer while allowing transparency, a frame unit 102 that supports both optical members 101a, 101b, and first and second image forming body units 105a, 105b that are added to parts from the left and right ends of the frame unit 102 to a handle portions (temples) 104 in the rear. Here, a first display device 100A on the left side of FIG. 1, which is a combination of the first optical member 101a and the first image forming body unit 105a, forms a virtual image for the right eye. Further, a second display device 100B on the right side of FIG. 1, which is a combination of the second optical member 101b and the second image forming body unit 105b, forms a virtual image for the left eye. It can be seen that for example, the first and second image forming body units 105a, 105b are respectively configured with projection lenses 30 each of which is accommodated in a lens barrel portion, and an image display device 80 including an image element and the like, from a comparison of FIG. 1 with FIG. 2 which is a cross-sectional view of a body portion that constitutes the transmission type display 100 in a plan view. In other words, the projection lens 30, the image display device 80, and the like, which are illustrated in FIG. 2, are accommodated in the inside of each of the first and second image forming body units 105a, 105b illustrated in FIG. 1.

Here, a frame 107 constituting the frame unit 102 is an integral metal component made of an aluminum die cast and various other metal materials. On the right side of the frame 107, a first light guide device 20a (or simply referred to as a light guide device 20) and the first image forming body unit 105a are aligned, and are supported by being directly fixed, for example, using screws. On the left side of the frame 107, a second light guide device 20b (or simply referred to as a light guide device 20) and the second image forming body unit 105b are aligned, and are supported by being directly fixed, for example, using screws. In other words, the frame unit 102 is a fixing member (supporting member) that positions and fixes the first and second display devices 100A, 100B. In addition, the first light guide device 20a and the first image forming body unit 105a are fitted and aligned to each other, and the second light guide device 20b and the second image forming body unit 105b are fitted and aligned to each other. Here, the frame unit 102 has a bent portion BE which is slightly bent with an angle bilaterally symmetrical so as to have a shape conforming to the forehead of the observer in the central portion CP. The first and second display devices 100A, 100B which are assembled in a pair on the left and right of the frame unit 102 are arranged with a certain degree of angle in front of the eyes of the observer by adjusting the curved condition of the bent portion BE. Although details will be described later with reference to FIG. 2, since the frame unit 102 is configured as described above, the frame unit 102 functions as a parallax setting unit PS that sets the parallax.

As illustrated in FIG. 2, it can be seen that the first and second display devices 100A, 100B each include a projection perspective device 70 which is a projection optical system and the image display device 80 that generates image light. The projection perspective device 70 has a role for projecting the image formed by the image display device 80 as a virtual image to the eyes of the observer. Hereinafter, since the structure of the first display device 100A and the structure of the second display device 100B are equivalent, a description will be made regarding the first display device 100A, and a description regarding the second display device 100B will be omitted. In the first display device 100A, the projection perspective device 70 includes a first optical member 101a or the light guide device 20, and a projection lens 30 for imaging. The first optical member 101a or the light guide device 20 is configured with a light guide member 10 for light guidance and transparency, and a light transmitting member 50 for transparency. In addition, the first image forming body unit 105a is configured with the image display device 80 and the projection lens 30.

The image display device 80 is configured with a self-luminous illumination device including for example, an organic EL (OLED) as a light source, or a backlight and a liquid crystal panel, forms a panel surface which is a reference in pixels of a matrix shape, and emits the image light from the panel surface.

The projection lens 30 is a projection optical system which is configured with, for example, a plurality of optical lenses, and emits the image light from the image display device 80 to the light guide device 20, and each optical lens is accommodated in the lens barrel portion. In addition, the optical lens constituting the projection lens 30 may include a non-axially symmetric curved surface (free-form surface).

As described above, the light guide device 20 is configured with the light guide member 10 for light guidance and transparency, and the light transmitting member 50 for transparency. The body portions of the light guide member 10 and the light transmitting member 50 are made of resin materials having high optical transparency in a visible range, such as a cycloolefin polymer, and for example, are formed respectively by injecting and solidifying the thermoplastic resin into the mold. In addition, the light guide member 10 is a part of the prism type light guide device 20. The light transmitting member 50 is a member (auxiliary optical block) assisting a perspective function of the light guide member 10 and is integrally fixed to the light guide member 10 to forma single light guide device 20. The light source side (the base side) of the light guide device 20 is accurately positioned and fixed to the projection lens 30, by being fitted into the lens barrel portion accommodating the projection lens 30.

Hereinafter, the structure and the like of the light guide device 20 will be described in detail in terms of optical functions. In the light guide member 10 of the light guide device 20, a portion on the central side near the nose (the front side of the eye) extends linearly in a plan view. In the light guide member 10, a portion disposed at the center side near the nose, that is, the light exit side includes a first surface S11, a second surface S12, and a third surface S13 as side surfaces having optical functions, and a portion disposed at the periphery side far from the nose, that is, the light incidence side includes a fourth surface S14 and a fifth surface S15 as side surfaces having optical functions. Of these, the first surface S11 and the fourth surface S14 are continuously adjacent to each other, and the third surface S13 and the fifth surface S15 are continuously adjacent to each other. Further, the second surface S12 is disposed between the first surface S11 and the third surface S13, and the fourth surface S14 and the fifth surface S15 are adjacent and form a large angle. Moreover, here, the first surface S11 and the third surface S13 which are disposed facing each other have flat shapes which are substantially parallel to each other. Meanwhile, the other surface having an optical function, that is, the second surface S12, the fourth surface S14, and the fifth surface S15 are non-axially symmetric curved surfaces (free-form surfaces).

Here, among the respective surfaces constituting the light guide device 20, a half mirror layer accompanies the second surface S12. This half mirror layer is, for example, a reflective film having optical transparency which is made of a metal film or a dielectric multilayer film (in other words, a semi-transflective film), and the reflectivity for the image light is adjusted in order to facilitate the observation of external light in a see-through manner. Further, the fifth surface S15 is formed by depositing a light reflecting film RM made of an inorganic material or the like, and functions as a mirror reflection surface.

Further, in the light guide device 20, the light guide member 10 and the light transmitting member 50 are joined by being bonded together through an adhesive layer, and the half mirror layer accompanying the second surface S12 is formed in the joint part.

The light transmitting member 50 includes a first transmitting surface S51, a second transmitting surface S52, and a third transmitting surface S53, as side surfaces having an optical function. Here, the second transmitting surface S52 is disposed between the first transmitting surface S51 and the third transmitting surface S53. The first transmitting surface S51 is located on a surface which is extended from the first surface S11 of the light guide member 10, the second transmitting surface S52 is a curved surface that is integrated with the second surface S12 by being bonded thereto through an adhesive layer, and the third transmitting surface S53 is located on a surface which is extended from the third surface S13 of the light guide member 10. Among these, since the second transmitting surface S52 and the second surface S12 of the light guide member 10 are integrated with each other through bonding, they have shapes of substantially the same curvature.

Hereinafter, an example of the optical paths of the image light and the like will be described. The image light GL emitted from the image display device 80 is incident on the fourth surface S14 provided in the light guide member 10 of the light guide device 20 while being converged by passing through the projection lens 30. The image light GL that has passed through the fourth surface S14 proceeds while being converged, is reflected by the fifth surface S15, is incident again to the fourth surface S14 from the inside and reflected. The image light GL which is reflected by the fourth surface S14 is incident to the third surface S13 and is totally reflected, and is incident to the first surface S11 and is totally reflected. Here, the image light GL forms an intermediate image in the light guide member 10 before and after passing through the third surface S13. The image surface of this intermediate image corresponds to the panel surface of the image display device 80. The image light GL which is totally reflected on the first surface S11 is incident on the second surface S12, but in particular the image light GL incident on the half mirror layer provided on the second surface S12 is partially transmitted through and is partially reflected by the half mirror layer, and is incident again on the first surface S11 and passes therethrough. The image light GL that has passed through the first surface S11 is incident on the pupil of the eye of the observer or the equivalent position as a substantially parallel light beam. In other words, the observer observes the image that is formed on the panel surface of the image display device 80, through the image light GL as a virtual image.

Meanwhile, since the third surface S13 and the first surface S11 are flat surfaces which are substantially parallel to each other, and there are the third transmitting surface S53 that is extended from the third surface S13 and the first transmitting surface S51 that is extended from the first surface S11, aberrations or the like do not occur in the external light HL, and the observer observes an image of the outside world without distortion. As described above, the light guide device 20 configures a see-through type optical system that superimposes the image light and external light.

As described above, in this embodiment, the image light from the image display device 80 is guided by the reflection of five times including total reflections of at least two times, from the first surface S11 to the fifth surface S15, in the inside of the light guide member 10. This enables both the display of the image light GL and the see-through causing the external light HL to be viewed, and thus it is possible to correct the aberration of the image light GL.

Here, as described above, the first and second display devices 100A, 100B including the light guide device 20 (first and second optical members 101a, 101b) are assembled and fixed to the frame unit 102 (see FIG. 1) so as to form a left-right symmetric pair. In this case, as illustrated in FIG. 2, the light guide device 20 (the first and second optical members 101a, 101b) that guides the image light GL to the assumed position of the eye EY (hereinafter, referred to also as the assumed eye position EY) is fixed in a state of being arranged to be inclined inward such that the left and right principal rays PRa, PRb of the image light GL intersect at an angle in a range of for example, 1.0° to 5.0°. In other words, the value of the parallax angle $\theta$ which is an angle between the principal rays PRa, PRb defining the parallax between the left and right eyes is set in a range of 1.0° to 5.0°, and the first and second display devices 100A, 100B are fixed. Therefore, as illustrated, the assembly reference direction Asa of the first optical member 101a which is the light guide device 20 and the assembly reference direction Asb of the second optical member 101b intersect with an angle in the central portion CP, and the intersection angle, that is, the bent and curved condition is adjusted (set) by the frame unit 102 which is the parallax setting unit PS, such that it is assumed that the value of angle $\theta$ is set to any value in a range of 1.0° to 5.0°. In other words, the frame unit 102 functions as the parallax setting unit PS that sets the parallax, by generating the parallax angle $\theta$ of a predetermined angle or more by tilting the principal rays PRa, PRb of the image light that is emitted from each of the pair of the left and right first and second display devices 100A, 100B, according to the curved condition of the central portion CP. In the above configuration, it is ordinary that the observer observes towards the line of sight along the directions of the principal rays PRa, PRb. In other words, with respect to the angle of convergence which is an angle formed by the left and right lines of sight of the observer, in the case of an ordinary video, the value of the angle $\theta$ is determined, and the angle of convergence is determined, such that sense of distance of the observer is determined. Since the sense of distance for the image matches the sense of distance for the real object in the world that is viewed in the real field of view, the improvement in the visibility of the augmented reality (AR) can be expected.

Further, in each of the display devices 100A, 100B, the projection perspective device 70 (the light guide device 20 and the projection lens 30), which determines the optical path of the image light GL, that is, the focal distance and the image display position of the virtual image that is viewed, guides the image light GL so as to have the focal distance and to be in the image display position of the virtual image corresponding to the value of the angle $\theta$ representing the parallax, depending on the value of the angle. In other words, the pair of left and right display devices 100A, 100B sets the assumed display position for the assumed eye position EY of the image viewed by image light GL so as to correspond to the above-mentioned parallax.

Figure 3A:
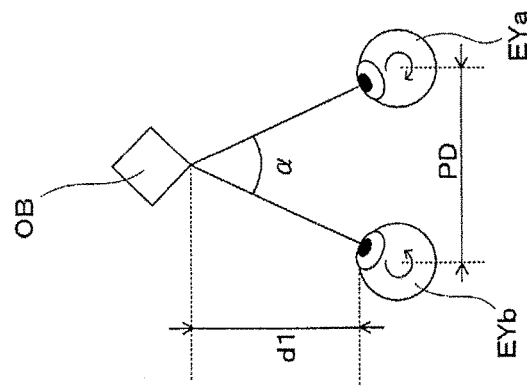
FIGS. 3A and 3B are diagrams illustrating a relationship between an angle of convergence and a distance of an object.
Figure 3B:
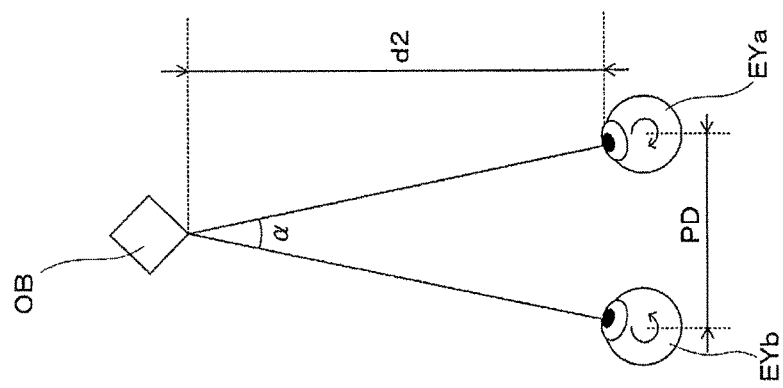
Figure 3C:
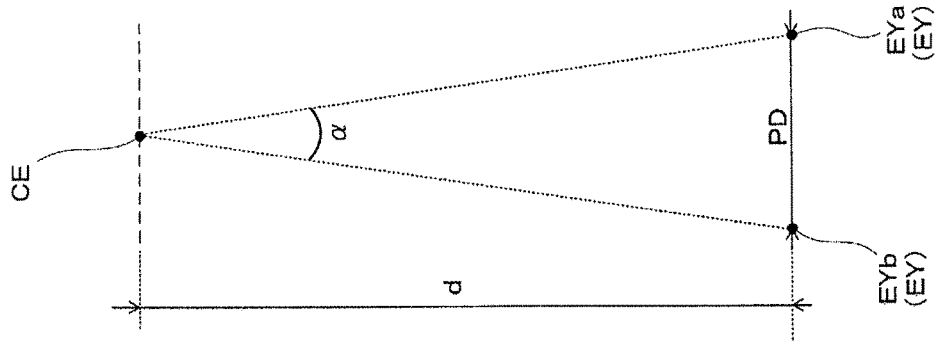
FIG. 3C is a diagram illustrating a relationship between the angle of convergence and a display distance of a virtual image.

Hereinafter, a relationship between the angle of convergence and the distance to the object will be described with reference to FIGS. 3A to 3C, through comparison of FIG. 3A with FIG. 3B. First, as illustrated in FIG. 3A, if the object OB is placed relatively close to both eyes EYa, EYb (distance d1) and viewed, since both eyes EYa, EYb move inwardly, the value of the angle $\alpha$ of convergence which is the angle formed by the lines of sight of the left and right eyes EYa, EYb increases. On the contrary, as illustrated in FIG. 3B, if the object OB is placed relatively far from both eyes EYa, EYb (distance d2: d2>d1) and viewed, the value of the angle $\alpha$ of convergence decreases.

Figure 4:
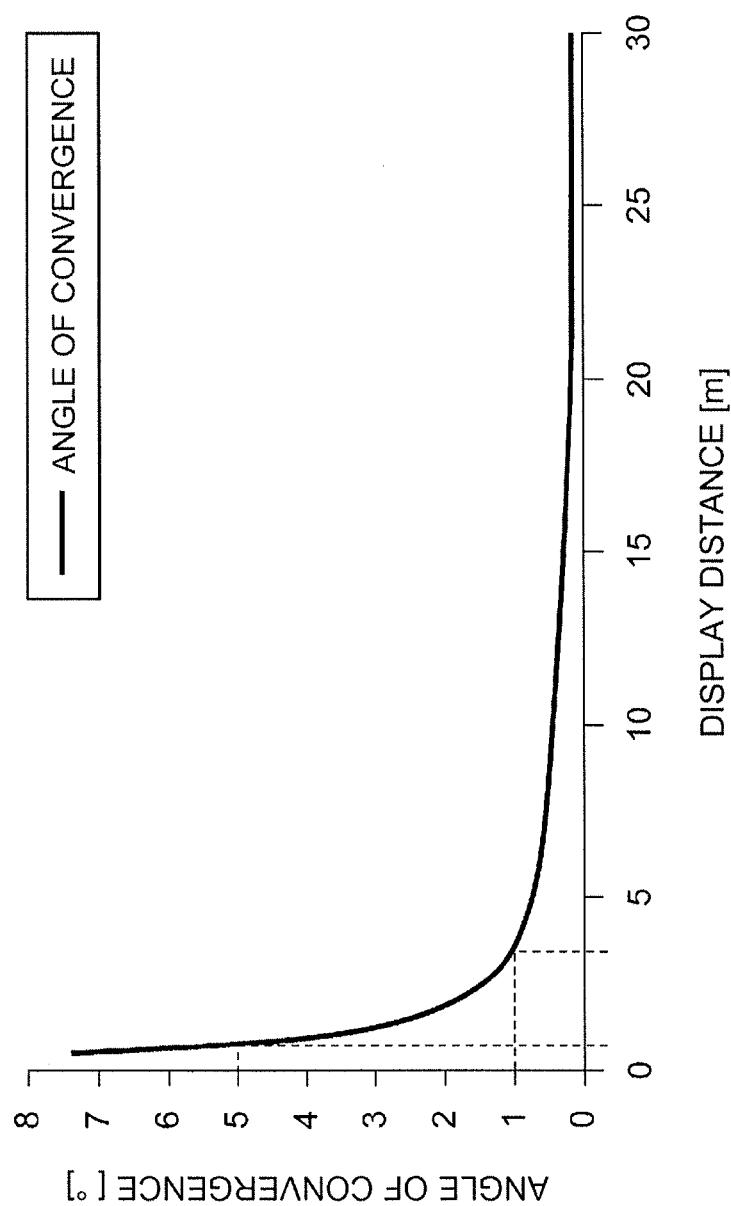
FIG. 4 is a graph illustrating a relationship between the angle of convergence and the display distance.

Here, when an image is viewed with both eyes as in this embodiment, the angle of convergence which is an angle between the display object and the left and right eyes has an important role to understand the sense of distance of the image light, in addition to the image assumed position based on the emission state of the image light GL, that is, the focal distance or the like that is determined based on the optical design of the projection lens 30 or the like. That is, the angle α of convergence is determined under the influence of the parallax between the left and right eyes, for the displayed image, and if the angle α of convergence is increased, the observer feels that the image is located nearby; and if the angle α of convergence is decreased, the observer feels that the image is located remotely. For example, as illustrated in FIG. 3C, if the pupillary distance PD (the distance between the right eye and the left eye) of the observer is assumed as 65 mm, a relationship between the angle α of convergence about the center point CE of the virtual image that is viewed as one point in the center of the image, that is, one point which is located in the front part in the direction of the principal ray, and a display distance d which is a distance from the assumed position of the virtual image caused by the image light to the positions of the eyes EYa, EYb (assumed eye position EY) is represented as a graph illustrated in FIG. 4. In other words, in FIG. 4, the horizontal axis represents the display distance d (m), and the vertical axis represents the angle α (°) of convergence. In this case, for example, if the value of the angle α of convergence is 1.0°, the display distance d is approximately 4 m (or about 4 m); and if the value of the angle α of convergence is 5.0°, the display distance d becomes about several tens of cm.

As described above, the angle α of convergence defining the sense of distance of the observer is determined by the parallax which is set in the transmission-type display 100, that is, the angle θ formed by the principal rays PRa, PRb. More specifically, since the value of angle θ is set to any value within a range of 1.0° to 5.0°, it is possible to perform display corresponding to various aspects, for example, from the case of working while viewing occasionally the virtual image IM which is an image from the image light emitted from the transmission-type display 100 which is visually recognized as being located in the assumed display position, at approximately the same position as the real object MA in a state where the observer PE has the real object MA at hand as a use state illustrated in FIG. 5A, to the case of working while viewing occasionally the virtual image IM with a certain sense of distance from the real object MA at hand as another use state illustrated in FIG. 5B. In other words, in many cases of the use states at a wide variety of work sites, the parallax, that is, the value of the angle θ is appropriately set to any in the above range, according to the use state, this allows the user to experience the world of augmented reality (AR) having an appropriate sense of distance.

Figure 5A:
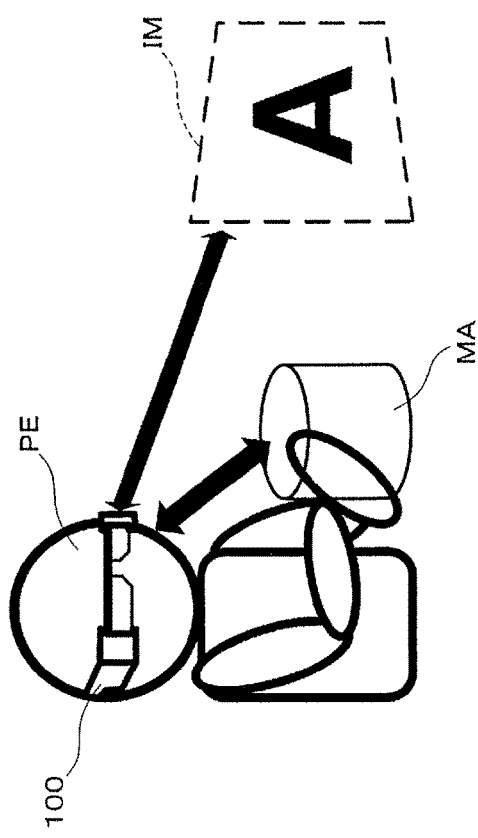
FIGS. 5A and 5B are diagrams illustrating a relationship between a display distance and a distance of an object.
Figure 5B:
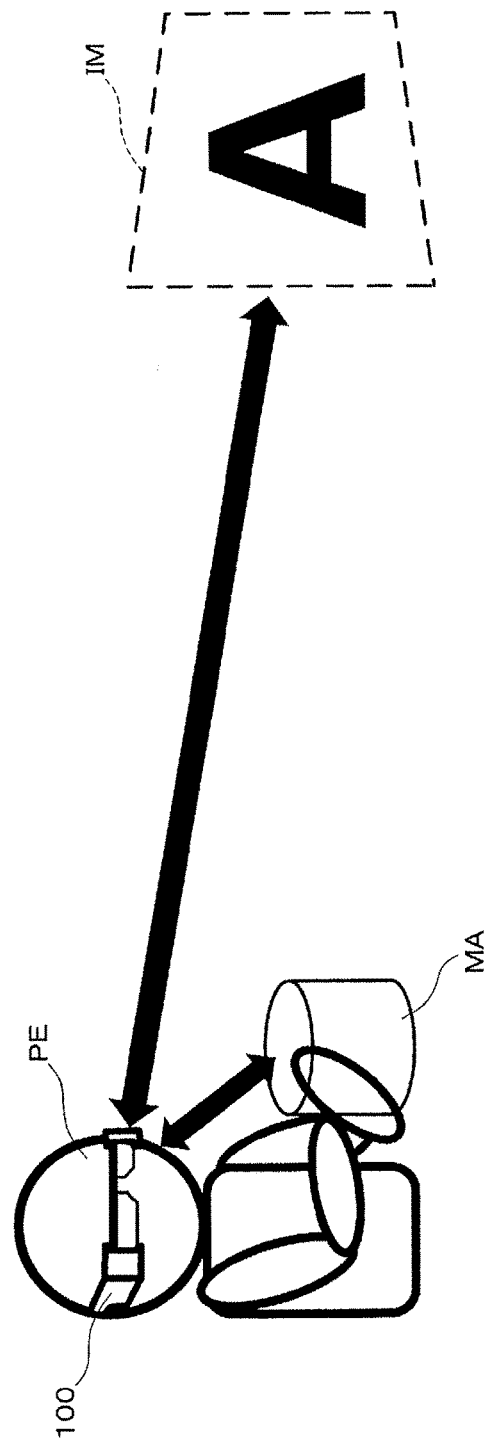

Unlike the case of the use state for working described above, for example, in the case where the image light is assumed to be visually recognized in a state of viewing an image located at a relatively remote site such as watching movies, it is considered to set a state where the display distance is increased from the state illustrated in FIG. 5B (for example, d=25 m or so. In this case, the value of the angle θ indicating the parallax is for example, about 0.15'). Whereas such an embodiment is suitable for uses such as watching videos in a relaxed state, if employing the embodiment in the use state of working while placing the real object MA at hand, as in the above case, the observer needs to release the eye from the real object MA at hand and view the virtual image IM that appears far away, in order to view an image, and it is necessary to intensely perform a change of the angle of convergence and the regulation of focus, therefore it is considered that there is a possibility that the eyes of the observer are tired by repeating them. Further, when the virtual image IM is excessively far away, if the point of view is focused on one of the real object MA and the virtual image IM, the point of view is not focused on the other, such that it becomes difficult to enable the augmented reality (AR) that superimposes image light on a world that is viewed in the real field of view. In contrast, since this embodiment has an optical structure in which the left and right display devices 100A, 100B of a pair are tilted and disposed, a parallax is provided on the left and right images by tilting the principal ray for the left and right image light. Thus, it is possible to make the virtual image IM be in substantially the same position as the real object MA at hand of the observer, depending on the setting angle of parallax, for example, as illustrated in FIG. 5A, and the like, the virtual image IM and the real object MA can be visually recognized as being superimposed on each other at the same position, and augmented reality (AR) is enabled. Further, in this case, since the principal rays PRa, PRb are tilted according to the parallax, the state of the angle of convergence of the eyes of the observer is focused on the display position of an interest reasonably and naturally. In addition, in a pair of the left and right display devices 100A, 100B, the focal distance is adjusted, and the image display position of the viewed virtual image IM is set to the display distance d corresponding to the value of the angle θ indicating the parallax, thus a problem of non-matching of the angle of convergence and the regulation, a so called contradiction between the angle of convergence and the regulation is also avoided or suppressed.

In the above description, the value of the angle θ (the angle θ formed by the principal rays PRa, PRb) which is the parallax which is determined by the frame unit 102 which is the parallax setting unit PS is set to any value within the range of 1.0° to 5.0°, but various possible ranges of the angle θ are considered, and for example, the parallax may be set to a predetermined angle within the range of 0.2° to 7.4°. In the case of this range, as can be seen with reference to the graph of FIG. 4, it is possible to define the value of the display distance d in a wide range from about 20 m to about 0.5 m, and to adjust the state of viewing of the image light suitably depending on the intended use or the like. Further, the parallax can be set to a predetermined angle in the range of 0.2° to 2.0°. In this case, the parallax can be set in a wide range from the case where the observer feels the image is relatively far as the sense of distance to the case where the observer feels the image is relatively close.

On the other hand, as another aspect, as a specific example in which a single value is determined for the value of the angle θ indicating the parallax, it is considered that the assumed display position of the image viewed by the image light (the position of the virtual image IM) is set to the focal distance which is, for example, approximately 4 m from the assumed eye position EY (in other words, is set to the display distance d=4 m as an example), and the value of the angle θ is set so as to be the angle of convergence corresponding to the display distance d=4 m, in the optical system (the projection lens 30 and the like) constituting the pair of left and right display devices 100A, 100B. In this case, as already described, from the graph of FIG. 4, the value of the angle θ is about 1°. In this case, it is easy to form the image having the sense of distance required in common in use in many work sites. Moreover, in the case where the value of the angle θ is fixed to a single value as described above, the curved condition determined for the frame unit 102 which is the parallax setting unit PS may be prepared. Alternatively, only one fixed location may be provided for the assemble location of a pair of left and right display devices 100A, 100B, and it is not necessary to set the parallax to the values of some angles θ by providing, for example, a plurality of fixed locations. Further, even in the optical system such as the projection lens 30, for example, it is not necessary to have a focus function in order to change the focal distance, and the optical system may be configured with a combination of fixed lenses. Therefore, it is possible to simplify the device, and to intend, for example, a reduction in the size and the weight.

The transmission-type display 100 according to this embodiment as described above is configured such that the image light GL and the external light HL are superimposed and visually recognized in the first and second display devices 100A, 100B which are provided on the left and right sides in a pair. In this case, a parallax of an angle (the value of an angle θ) is set by the frame unit 102 functioning as the parallax setting unit PS tilting the principal rays PRa, PRb of the left and right image light GL toward the inside. Thus, the transmission-type display 100 enables the augmented reality (AR) that superimposes image light on a world that is viewed in the real field of view, and can make the angle of convergence of the observer in the case of seeing the image light GL be in a suitable state. Further, in this case, since the distance of the assumed display position is caused to correspond to the distance that is felt in the parallax represented by the angle θ, by adjusting the focal distance of the image formed by the optical system of the first and second display device 100A, 100B, it is possible to reduce the contradiction between the angle of convergence and the regulation when seeing the image light GL. Thus, it is possible to reduce the fatigue of the observer in the use state of comparing the outside world (real object MA) by the external light HL and the image (virtual image IM) by the image light GL.

Second Embodiment

Hereinafter, a transmission-type display according to a second embodiment will be described. Further, the present embodiment is a modification example of the transmission-type display of the first embodiment, and is the same as in the case of the first embodiment except for the image control in the image display device 80, such that the entire illustration and description will be omitted.

Figure 6A:
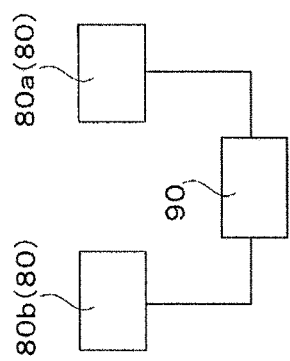
FIGS. 6A and 6B are diagrams illustrating control in a transmission-type display according to a second embodiment.
Figure 6B:
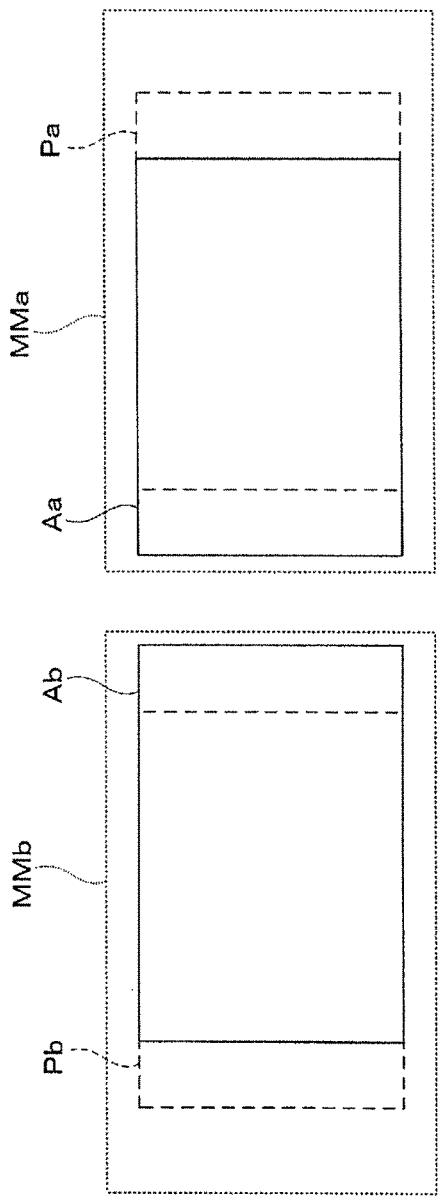

FIGS. 6A and 6B are diagrams illustrating the image control in the image display device 80 of the transmission-type display according to this embodiment, and FIG. 6A is a diagram illustrating a part of the internal structure of a transmission-type display of this embodiment. As illustrated in FIG. 6A, the transmission-type display of this embodiment includes image display devices 80a, 80b which are image display devices 80 respectively disposed in first and second display devices 100A, 100B which are provided on the left and right in a pair (see FIG. 1), and an image control unit 90 for an image process which performs image control and transmits image signals to the image display devices 80a, 80b. Here, the image control unit 90 functions as an image correction mechanism that performs correction by shifting the left and right images. Incidentally, the image control unit 90 is formed of, for example, a control circuit mounted in the interior of a user interface (not illustrated) that performs various operations of the transmission-type display.

Hereinafter, an example of image correction by the image control unit 90 will be described. FIG. 6B is a diagram illustrating conceptually the states of the virtual images IM that are visible to the left and right eyes, based on the panel images formed on the panel surfaces of the respective image display devices 80a, 80b, according to the image correction in the image control unit 90. Here, it is assumed that the right half indicates the image visible to the right eye, and the left half indicates the image visible to the left eye. Here, under the control in the image control unit 90, the primitive display areas Pa, Pb which are indicated by broken lines, among the image displayable ranges MMa, MMb which are indicated by dotted lines, are visually recognized, if they are not corrected by the image control unit 90. On the contrary, it is assumed that the image control unit 90 performs a correction of image-shifting the primitive display areas Pa, Pb to the correction display areas Aa, Ab indicated by a solid line. In the illustrated case, it is assumed that the entire image is shifted inwardly from the original position, and thus, the observer visually recognizes the image at a larger angle of convergence than the original angle of convergence. In other words, in the above case, viewing is performed in a state where the angle α of convergence is deviated from the parallax angle θ that is set by the parallax setting unit PS by the image correction.

In the transmission-type display of binocular vision, since the image correction by the image control unit 90 is enabled after the parallax is set by tilting the principal ray of the image light inwardly as in the present embodiment, it seems that the parallax (the value of the angle θ) is artificially changed, such that it is possible to change the angle of convergence. For example, in order to correspond to the AR, in the case where the observer wants to change parallax by some amount from the set parallax, it is possible to perform adjustment by such image correction. However, in the above case, the image displayable ranges MMa, MMb need to have a certain amount of margin for image shift. In other words, the area that is not in use is required. In addition, if the amount of image shift is large, a problem of contradiction between convergence and adjustment occurs. Therefore, it is desirable that the correction amount of the image correction by the image control unit 90 is in a range corresponding to the angle difference within ±1.0° from the parallax (the value of the angle θ). Incidentally, the number of pixels corresponding to +1.0° or −1.0° depends on the resolution of the panel used in the image display devices 80a, 80b, and for example, it corresponds to about several tens of pixels. Since the image shift is performed within this range, an adjustment of changing the sense of distance given to the observer by the image correction, that is, adjustment for depth of an image is enabled, and it is possible to perform an AR process more flexibly. Further, in this case, since the image correction is performed in a range which is not excessively great from the parallax for which the angle difference is set, it is possible to suppress the fatigue caused by the contradiction between the angle of convergence and the regulation.

Further, although the value of the angle θ is set to any value within a range of 1.0° to 5.0° as an example of the range of the value of the angle θ in the first embodiment, it is possible to adjust the angle of convergence in the range of 0.0° to 6.0° in view of the above correction process. In this case, it is determined that the required working range can be substantially covered, based on human vision. Although it is described that "d=4 m" is set for the display distance d and the value of the corresponding angle θ is about 1°, as a specific example in which the value of the angle θ indicating the parallax is set to one value, in this case, if the correction is performed within the range corresponding to the angle difference less than ±1.0°, it is possible to adjust the angle of convergence in the range of 0.0° to 2.0°. In this case, as is clear with reference to FIG. 4, adjustment can be performed for a wide range from the case where the observer feels that the image is far to the case where the observer feels that the image is relatively close. In other words, a transmission-type display suitable for an AR process can be realized, only by providing a correction function of a slight image shift, without making an optical structure complex.

Third Embodiment

Hereinafter, a transmission-type display according to a third embodiment will be described. Further, the transmission-type display of the present embodiment is a modification example of the transmission-type displays of the above respective embodiments, and is different from the cases of the above respective embodiments in including an angle changing unit that changes the postures of the pair of left and right display devices, and a focusing mechanism that focuses the projection lens. In addition, the present embodiment is the same as in the case of the first embodiment and the like for the structure other than the angle changing unit and the focusing mechanism, such that the entire illustration and description will be omitted.

Figure 7:
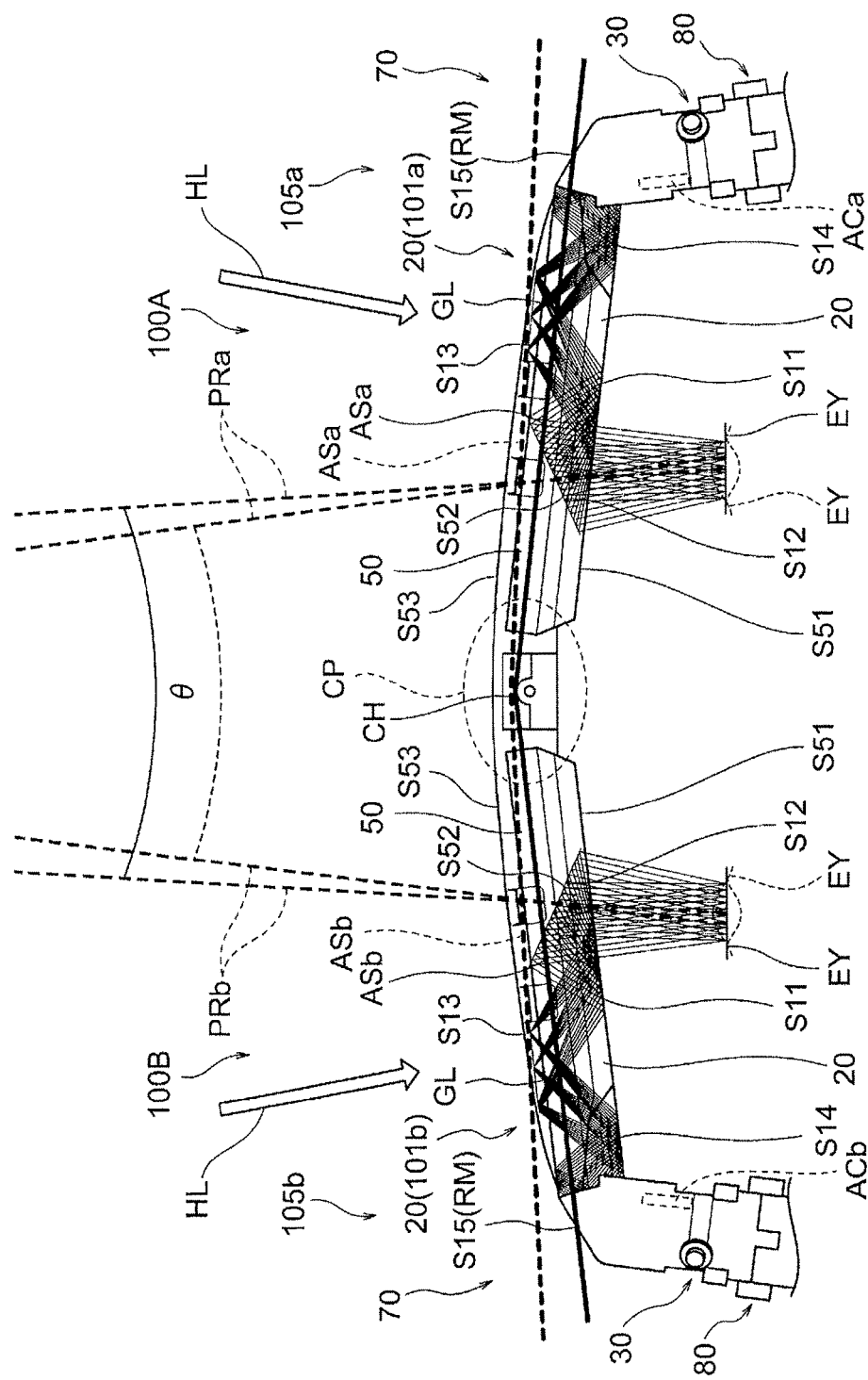
FIG. 7 is a cross-sectional view of a body portion that constitutes a transmission type display device according to a third embodiment in a plan view.

FIG. 7 is a cross-sectional view of a body portion of the transmission type display device according to the present embodiment in a plan view, and is a diagram corresponding to FIG. 2. In the present embodiment, first, as illustrated, since the parallax setting unit that sets the parallax (for example, see the frame unit 102 in FIG. 1) includes the angle changing unit, the intersection angle between the assembly reference direction ASa of the first optical member 101a which is the light guide device 20 and the assembly reference direction ASb of the second optical member 101b is adjustable. In other words, it is possible to change the angle of the second optical member 101b relative to the first optical member 101a. Thus, as illustrated, it is possible to change the value of the angle θ formed by the principal rays PRa, PRb defining the parallax between the left and right eyes. In addition, in the angle change, not only the respective optical members 101a, 101b (light guide device 20), but also the first and second display devices 100A, 100B move integrally. Various configurations are considered for the angle changing unit, and for example, a configuration of performing a precise operation by applying a piezo element, a micro-adjuster, or the like that changes the postures of the first and second display devices 100A, 100B in the bilaterally symmetry, in a pair on the left and the right sides. In addition, it is possible to change the angle continuously or stepwisely in the central portion CP of the frame unit 102 (see FIG. 1) which is the parallax setting unit, and it is considered to provide an angle adjustment member that precisely operates the hinge with a stopper capable of fixing the frame unit 102 at a desired angle (for example, placed in the same position as the hinge HN illustrated in FIG. 11). When changing the postures of the first and second display devices 100A, 100B to a desired state, typically, it is considered to use the deformable moving element such as the piezoelectric element and the hinge for the angle change unit. Units other than the above may be applied as the angle changing unit, as long as they are the deformable moving element and can precisely be controlled.

In addition to the above, in this embodiment, it is assumed that the optical lenses (not illustrated) constituting a pair of left and right projection lenses 30, respectively constitute a focusing lens group, and are moved along the optical axis direction by a pair of left and right actuators ACa, ACb, in other words, the projection lens 30 has a focusing mechanism. In other words, the focus mechanism functions as a focal distance adjustment unit that adjusts the focal distance.

Since it is possible to adjust the focal distance in the projection lens 30, in the case where the value of the angle θ, in other words, the parallax is changed by the angle changing unit of the above-mentioned parallax setting unit, it is possible to change the focal distance of each of the display devices 100A, 100B, in turn, the assumed display position of the image that is visually recognized by the image light GL (the assumed position of the virtual image IM), in response the change.

As described above, since the parallax setting unit includes the angle changing unit, and the projection lenses 30 of the first and second display device 100A, 100B include the focus mechanism in this embodiment, it is possible to change the assumed display position of the image that is visually recognized by the image light, according to the change of the parallax.

Others

Hitherto, although the invention has been described with reference to the above respective embodiments, the invention is not limited to the above embodiment, and various embodiments can be implemented in a scope without departing from the spirit thereof. For example, in the above description, although the image display device 80 is formed of an OLED element, a liquid crystal panel, or the like, and without being limited to thereto, various embodiments of image display devices can be applied. In addition, various embodiments of first and second display devices 100A, 100B can be applied. For example, it is considered that various types of organic ELs other than the OLED element, an inorganic EL, a LED array or the like can be applied, and transmission-type and reflective type liquid crystal panels are applied. Further, a configuration using DMD is possible, and it is possible to configure the image light (for example, see FIG. 12B to be described later) by the MEMS.

Figure 8A:
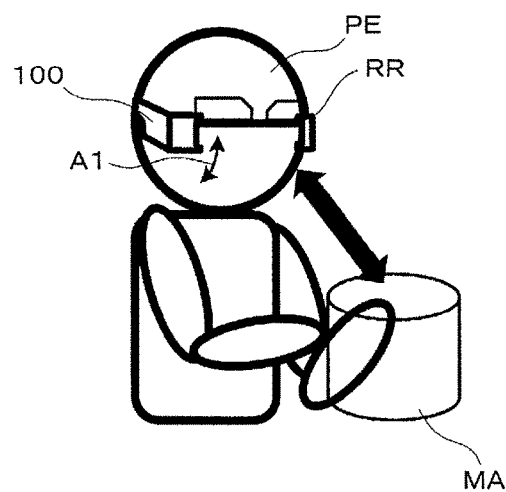
FIGS. 8A and 8B are diagrams illustrating a modification example of the transmission-type display.
Figure 8B:
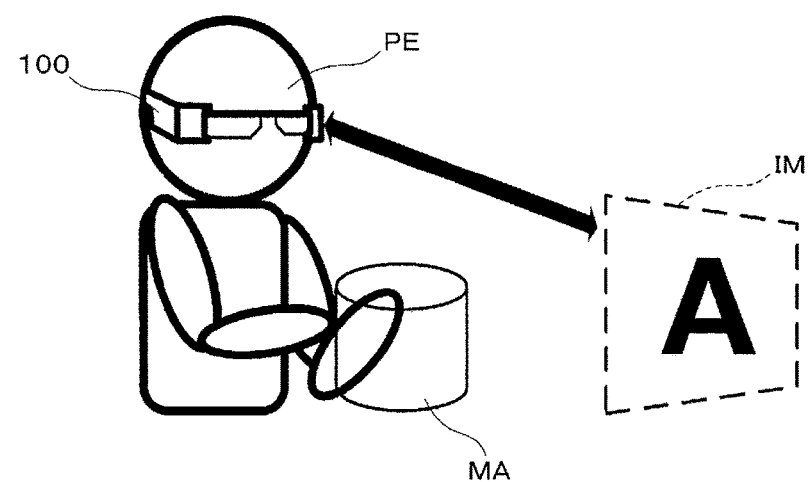

Further, for example, as illustrated in FIGS. 8A and 8B, the transmission-type display 100 may further include a flip-up mechanism. If describing a specific example with reference to the drawings, as illustrated in FIG. 8A, the specific example may include a flip-up mechanism that flips up at least an eye front part (for example, a light guide device which is an eye front part, or the like) of each of the display devices 100A, 100B, of the transmission-type display 100 so as to be retracted from the eye front position. As the flip-up mechanism, for example, it is considered to provide a rotating mechanism RR that rotates the eye front part and the frame unit in the direction of the arrow A1, with the frame unit as an axis. In this case, in a state where the eye front part is flipped up, the observer concentrates on the operation at hand without viewing the image (virtual image), and can view the virtual image IM viewed by the image light, by returning the flipped eye front portion as required during the operation, as illustrated in FIG. 8B. Incidentally, not only the eye front part, but also the entire respective display devices 100A, 100B may be flipped up.

Figure 9:
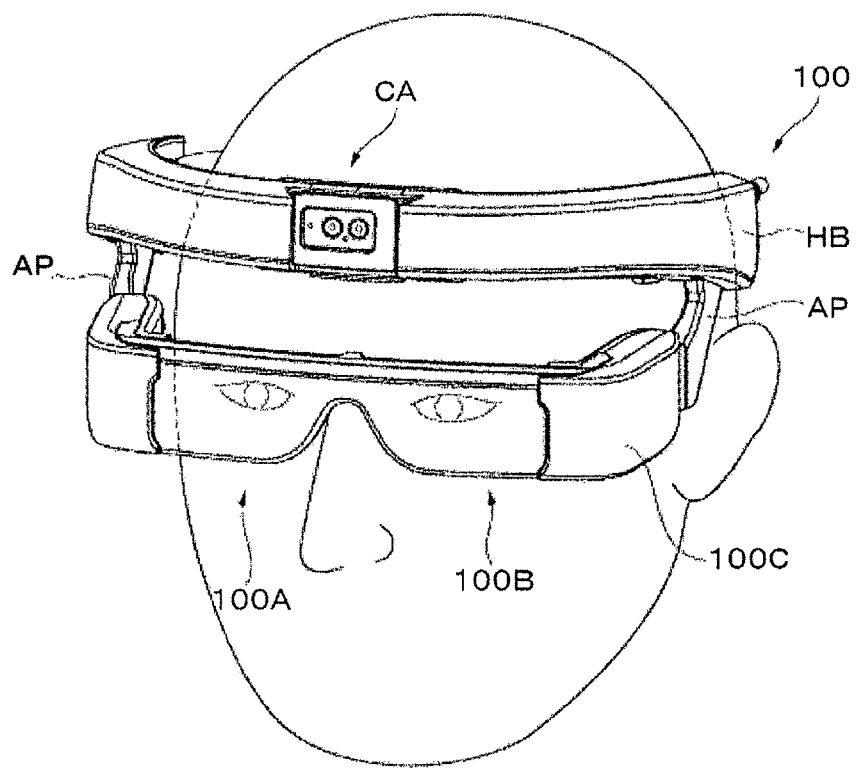
FIG. 9 is a perspective view briefly illustrating the appearance of another example of the transmission-type display.
Figure 10B:
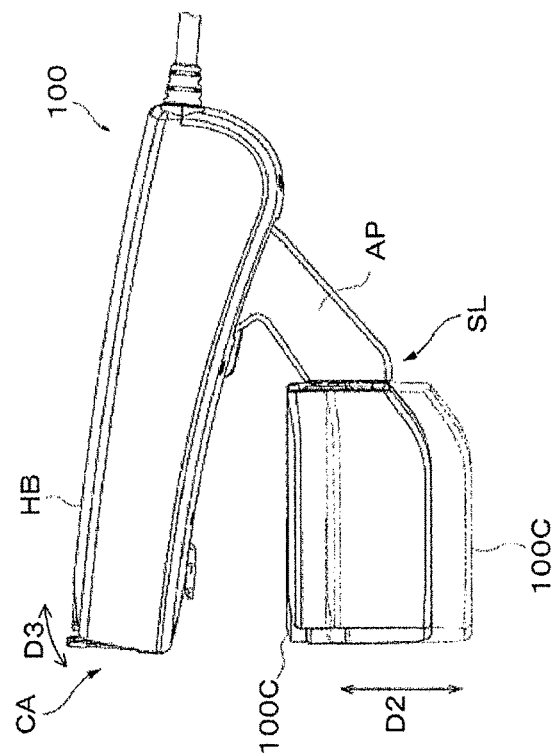
FIG. 10B is another example of a side view of the transmission-type display illustrated in FIG. 9.
Figure 10A:
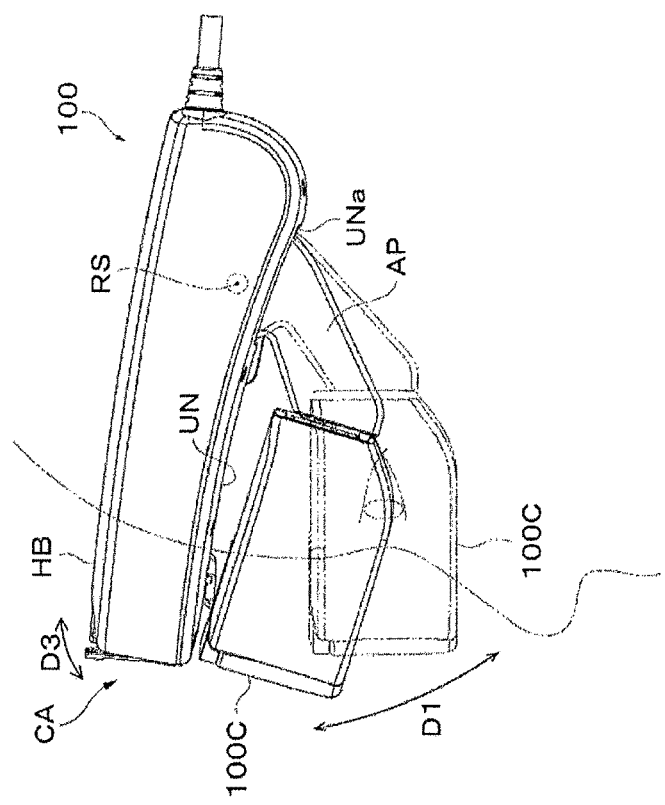
FIG. 10A is an example of a side view of the transmission-type display illustrated in FIG. 9.

Further, the transmission-type display 100 may be configured as illustrated in FIG. 9 and FIGS. 10A and 10B. To be more specific, an example of the transmission-type display 100 illustrated in FIG. 9 and FIGS. 10A and 10B includes a headband portion HB, a display unit 100C, a pair of arm portions AP, and a slid mechanism SL. The head band portion HB is a member that has an arcuate contour along the head of the observer, and is attached to the head of the observer or a helmet or the like that is mounted to the head. The display unit 100C is a body portion having the optical function that displays a virtual image. A pair of arm portions AP is a member mounted rotatably relative to the head band portion HB, and rotatably moves the display unit 100C relative to the head band portion HB about the direction D1 as indicated as a solid line and a dashed line in FIG. 10A. The slide mechanism SL is a mechanism for slidably moving the display unit 100C relative to the arm portions AP about the direction D2 as indicated as a solid line and a dashed line in FIG. 10B.

The head band portion HB is attached to one end of the arm portion AP which will be described later, and is equipped with a camera CA, such that it is intended to control some functions of the transmission-type display 100. The camera CA includes, for example, a stereo camera, an illumination sensor that detects the illuminance of external light, an LED for illumination, and the like, such that it functions as the imaging unit. In addition, the camera CA is rotatable about the direction D3, as illustrated. Further, in this case, an image captured in the transmission-type display 100 may be intended to be displayed by the display unit 100C. Incidentally, since the camera CA is rotatable about the direction D3, it is possible to adjust the direction of the camera CA to a desired angle while viewing, for example, the display status in the display unit 100C.

The display unit 100C is a body portion having the optical function into which the left and right display devices 100A, 100B of a pair are incorporated, as illustrated, and is disposed in front of the eye of the observer, such that it causes the transmission-type display 100 to function as a HMD. Here, as described above, the display unit 100C is retractable from the front of the eye by the arm portion AP and the slide mechanism SL.

A pair of arm portions AP is rotatably supported, with the rotating axis RS provided on the inside of the headband portion HB as a center axis, through the opening UNa formed on the lower surface UN of the head band portion HB. Accordingly, the display portion 100C is rotatable about the direction D1 at the time of mounting.

The slide mechanism SL connects the display unit 100C and the arm portion AP, and is configured to slidably move the display unit 100C relative to the arm portion AP, in a direction toward or away from (direction D2) the head band portion HB.

Through the above configuration, for example, when the image may not be visually recognized, or the like, the observer can retract or move the display unit 100C, by rotating or sliding it, in the above-mentioned transmission-type display 100. For example, if changing a state in which AR is displayed at hand during the work at hand to a state in which AR is displayed at the top during the work at the top such as a shelf, the display unit 100C may be slid and moved by the slide mechanism SL. If the display unit 100C is in a state of being completely retracted, it may be rotated by the arm portion AP. Further, in the case of the above configuration, since the camera CA is not on the side of the display portion 100C, a structure that supports the display unit 100C becomes simple and lightweight.

In addition, various embodiments are also possible for the frame unit 102 which is the parallax setting unit PS, and the parallax may be set to some values of the angle θ, by providing, for example, a plurality of fixing positions, without bending the central portion.

Figure 11:
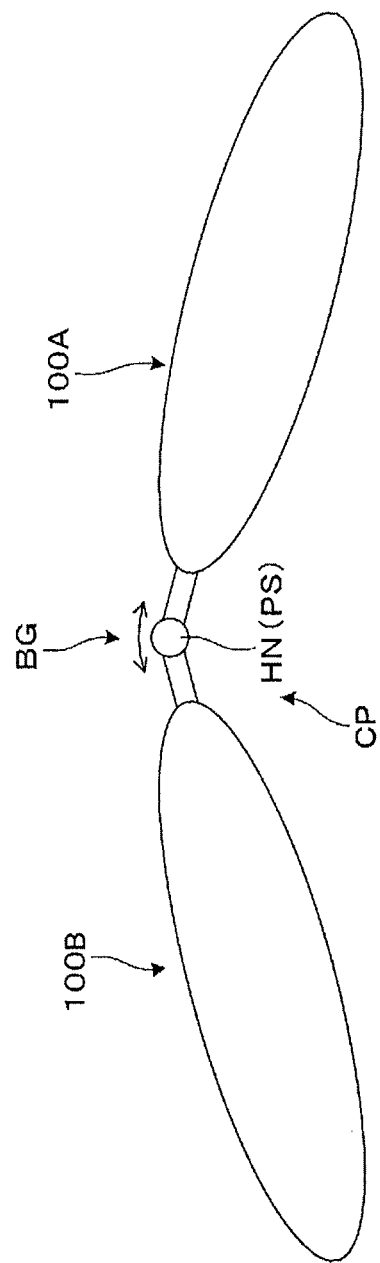
FIG. 11 is a diagram conceptually illustrating still another example of the transmission-type display.

In addition, in the third embodiment, for example, as illustrated in FIG. 7, when the intersection angle in the left and right assembly reference directions is adjustable by including the angle changing unit, although the mechanism that adjusts the central portion of the frame unit at the desired angle is assumed to be provided in the frame unit which is the parallax setting unit, it is possible to provide the angle changing unit even in the transmission-type display without the frame unit. For example, as illustrated in FIG. 11, it is considered to configure the parallax setting unit PS as the angle adjustment member that is supported only by the installation unit (bridge unit) BG that is provided between the pair of left and right display devices without the frame unit, and precisely operates those such as the hinge HN with a stopper capable of adjusting and fixing at a desired angle in the installation unit BG.

Further, in the above, 65 mm is assumed as a standard distance between eyes, and any other figures may be set for the pupillary distance PD of the observer. For example, the average of Japanese is said to be 60 mm to 65 mm, and it is also necessary to correct and calculate the angle of convergence due to the difference between eyes, in the person of 60 mm and the person of 65 mm. Such an individual difference may be corrected and changed in conjunction with the change in the optical setting by the parallax setting unit PS described above, and the adjustment of shifting the left and right display positions in the image correction inward and outward from the standard position. In addition, the individual differences of the distance between eyes may be absorbed to some extent, by setting the eye ring diameter to a certain magnitude (for example, about 8 mm) in the formation of the image light in the optical system.

In the configuration described above, for example, a variable panel (liquid crystal panel) for changing the refractive index distribution is disposed in the most close rear stage of an optical modulator which is configured with a liquid crystal panel or the like, and the state of the liquid crystal is changed for each position in the variable panel depending on the pass area of the image light that is emitted from the optical modulator and is polarized, such that the refractive index of the passed polarized light is changed in units of pixels or area units each including a plurality of pixels, and the optical path distance may be changed in units of pixels or area units. Since the left and right display devices of a pair have different refractive index distribution for the left eye and for the right eye, respectively, the assumed display position of the image to be visually recognized is adjusted for each area of the image, and this enables more natural stereoscopic vision. By applying this, for example, it is possible to further improve the AR visibility.

In the above description, although an intermediate image is formed in the inside of the light guide member 10, it is also applicable to a transmission-type display that performs see-through, without forming an intermediate image.

In the above description, the contour of the half mirror layer (semi-transmissive reflective film) provided on the second surface S12 can be changed appropriately according to the application and other specifications.

Figure 12A:
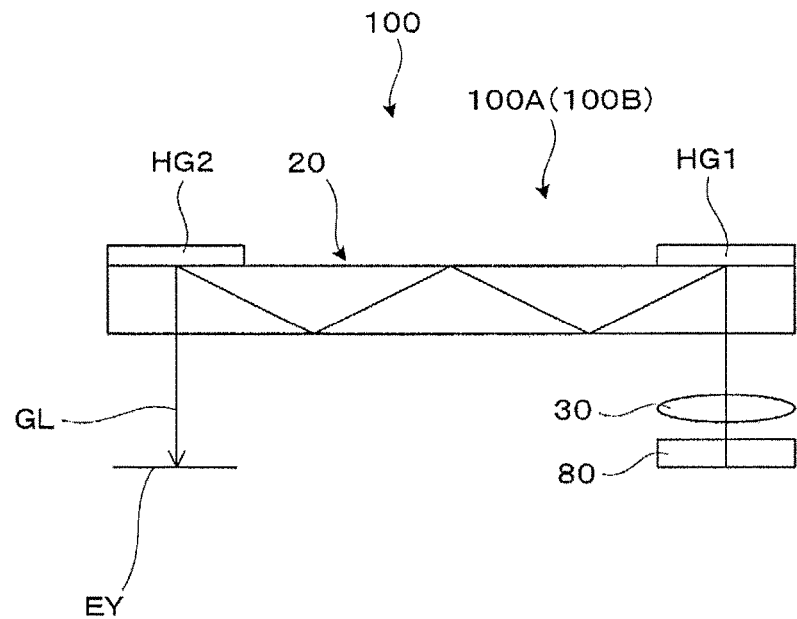
FIG. 12A is a diagram conceptually illustrating another example of the transmission-type display.

In the above description, although the half mirror layer is a simple semi-transmissive film (dielectric multilayer film), the half mirror layer can be replaced with a hologram element of a flat surface or curved surface. Further, even in an aspect other than the transmission-type display (HMD) illustrated in FIGS. 1 and 2, for example, as illustrated in FIG. 12A, in the respective display devices 100A, 100B, it is possible to apply hologram elements HG1, HG2 at positions corresponding to the light reflecting film RM of the fifth surface S15 or the half mirror layer of the second surface S15, in FIG. 2 or the like. In the case of using these hologram elements HG1, HG2, for example, it is also possible to add optical functions such as light collecting to the hologram elements HG1, HG2, and it is possible to determine the assumed eye position EY by appropriately adjusting the optical path of the image light GL emitted through the projection lens 30 from the image display device 80 by using the light collecting function of the hologram elements HG1, HG2. Further, in this case, the hologram elements HG1, HG2 may have all or a part of the role as a parallax setting unit.

Figure 12B:
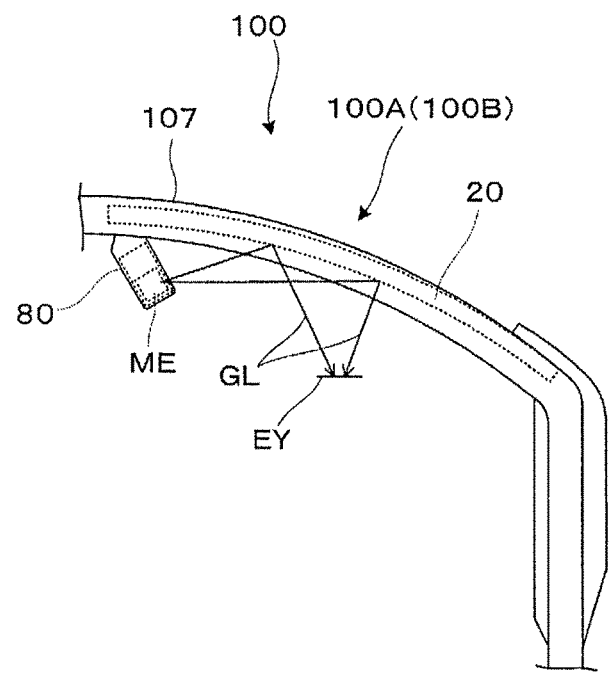
FIG. 12B is a diagram conceptually illustrating still another example of the transmission-type display.

Further, as illustrated in FIG. 12B, in the case of using an MEMS, it is also possible to appropriately adjust the emission range of the light by the MEMS constituting the image display device 80. To more specific, as illustrated, a scanning optical system ME formed of MEMS mirrors is built into the image display device 80, and performs a two-dimensional scanning of changing the exit angle of the light beam to the light guide device 20 that guides the light beam to the assumed eye position EY in the vertical and horizontal directions by adjusting the optical path of the image light GL by changing the posture. In this case, for example, it is possible to determine the assumed eye position EY by appropriately adjusting the range of the two-dimensional scanning by the scanning optical system ME. In addition, the scanning optical system ME formed of MEMS mirrors may have all or a part of the role as a parallax setting unit. In addition, the image display device 80 can be built into a nose member that supports the frame 107, as illustrated.

In the above description, although the light guide members 10 or the like extend in a horizontal direction in which eyes EY are lined up, it is also possible to arrange the light guide members 10 so as to extend in a vertical direction. In this case, the light guide members 10 are configured to be arranged in parallel, not in series.

In the example illustrated above, although the light guide device 20 has a single semi-transmissive reflective surface as a half-mirror layer, the semi-transparent reflective surface may be configured to be divided into a plurality of surfaces.

In the above description, although only an aspect in which image light and external light are superimposed is described, for example, the invention may be applied to the transmission-type display capable of switching an aspect using only the image light and an aspect using only the external light, without being superimposed.

In addition, the technique of the invention may be made to correspond to a product of a so-called video see-through constituted by a display and an imaging device.

The entire disclosure of Japanese Patent Application No. 2015-093916, filed May 1, 2015 is expressly incorporated by reference herein.

What is claimed is:

1. A transmission-type display that is capable of transmitting an external light while forming a virtual image, the transmission-type display comprising:
   a first display device on a left side of the transmission-type display, the first display device being arranged along a first line; and
   a second display device on a right side of the transmission-type display, the second display device being arranged along a second line, the first line and the second line meeting at a predetermined angle, and each of the first display device and the second display device guiding image light to form the virtual image and causing the image light and the external light to be superimposed on each other and viewed, wherein:
   the predetermined angle at which the first line and the second line meet defines a parallax of the virtual image by tilting a principal ray of the image light which is emitted from each of the first and second display devices; and
   the predetermined angle is adjustable to change the parallax.

2. The transmission-type display according to claim 1, wherein
   the predetermined angle at which the first line and the second line meet is adjusted within a range of 0.2° to 7.4°.

3. The transmission-type display according to claim 1, wherein
   the predetermined angle at which the first line and the second line meet is adjusted within a range of 0.2° to 2.0°.

4. The transmission-type display according to claim 1, wherein
   the predetermined angle at which the first line and the second line meet is adjusted within a range of 1.0° to 5.0°.

5. The transmission-type display according to claim 1, wherein
   a pair of the first and second display devices sets an assumed display position of an image viewed by the image light relative to an assumed eye position, corresponding to the parallax that is set according to the predetermined angle.

6. The transmission-type display according to claim 1, wherein:
   a pair of the first and second display devices sets an assumed display position of an image viewed by the image light to a focal distance that is approximately 4 m away from the assumed eye position; and
   the predetermined angle at which the first line and the second line meet is adjusted to correspond to the assumed display position, by positioning and fixing the first and second display devices.

7. The transmission-type display according to claim 1, wherein
   a pair of the first and second display devices includes an image correction mechanism that performs correction by shifting left and right images in a range corresponding to an angle difference within ±1.0° of the parallax, with respect to a position of a display distance corresponding to the parallax.

8. The transmission-type display according to claim 1, wherein:
   a pair of the first and second display devices includes a focal distance adjustment unit that adjusts a focal distance; and
   the parallax defined by the predetermined angle is adjusted by changing a posture of the pair of the first and second display devices.

9. The transmission-type display according to claim 8, wherein
   the posture of the pair of the first and second display devices is changed by using a deformable and movable element.

10. The transmission-type display according to claim 1, wherein
    the parallax defined by the predetermined angle is adjusted by using a frame unit that positions and fixes the first and second display devices in a pair on the left and right sides of the transmission-type display.

11. The transmission-type display according to claim 1, wherein
    the parallax defined by the predetermined angle is adjusted by using an angle adjustment member that is provided in an installation unit that connects the first and second display devices in a pair.

12. The transmission-type display according to claim 1, further comprising:

a flip-up mechanism that flips up a pair of the first and second display devices so as to be retracted from an eye front position.

13. The transmission-type display according to claim 1, wherein the parallax is an angle formed between the principal ray of the image light emitted from each of the first and second display devices.

14. The transmission-type display according to claim 1, wherein the parallax defines an angle of convergence for an image formed on the transmission-type display.

* * * * *